April 7, 1959  L. KATZ  2,880,665
GRILL ACCESSORY FOR ELECTRIC TOASTERS
Filed April 11, 1957
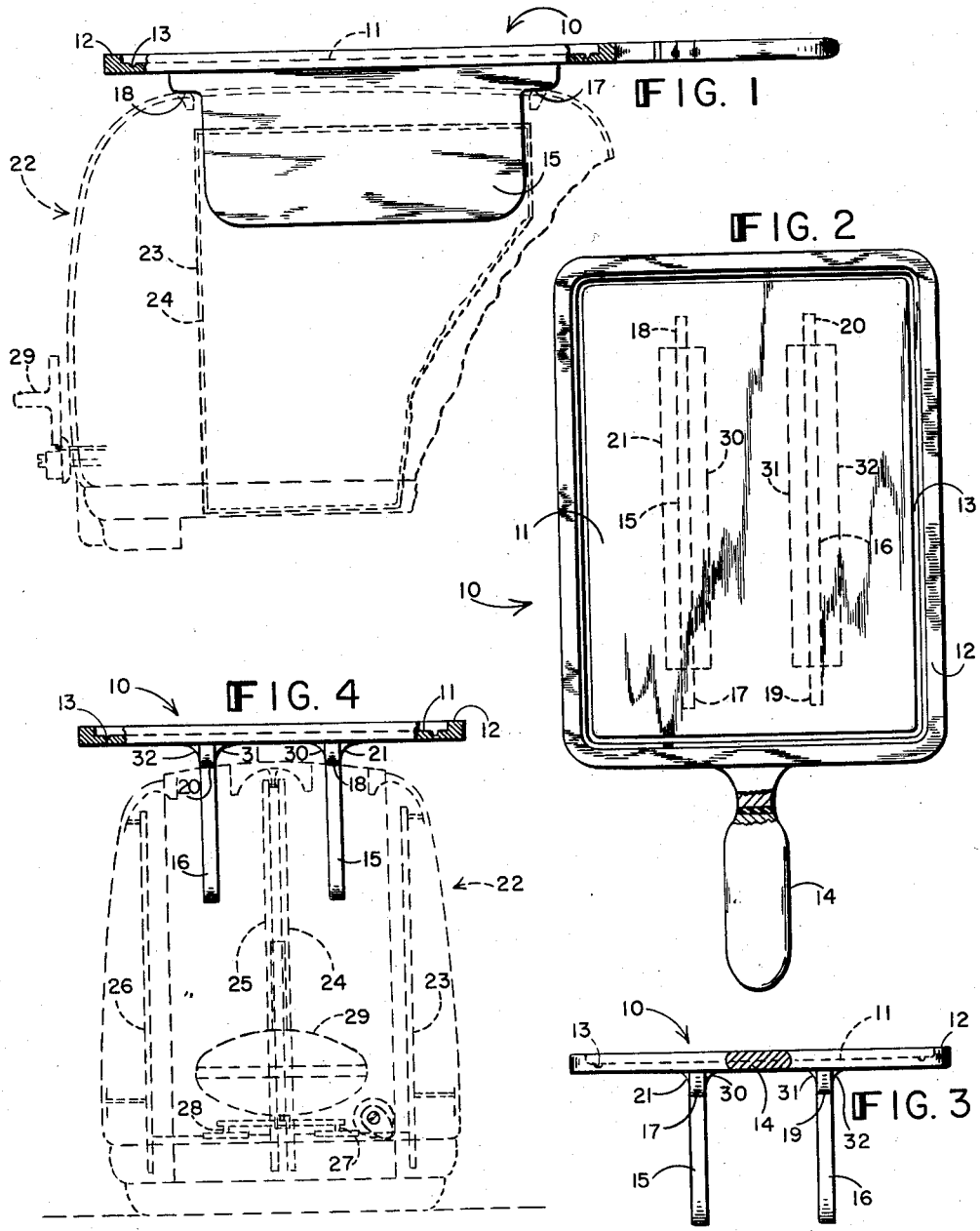
INVENTOR.
LOUIS KATZ
BY
ATTORNEY.

United States Patent Office 2,880,665
Patented Apr. 7, 1959

2,880,665

GRILL ACCESSORY FOR ELECTRIC TOASTERS

Louis Katz, Boston, Mass.

Application April 11, 1957, Serial No. 652,155

1 Claim. (Cl. 99—339)

This invention relates to food heating and cooking appliances and more particularly to an accessory to be used in conjunction with an electric toaster for all usual grill purposes.

The electric toaster with vertical heating elements is one of the few electric cooking appliances found in almost every home. However, it is designed for thin slices of bread and is unsuitable for the toasting of muffins or similar food of greater thickness or less coherence. These require a horizontal surface hot plate or grill or an oven. The cost of the required separate grill or of the use of a common size oven has been a serious deterrent to toasting of muffins and the like in the home.

It has long been desirable to provide some means for toasting muffins and the like using an electric toaster with vertical heating elements. Attachments for such toasters have been previously described, such as U.S. Patents 2,749,836, 2,659,295, 2,521,855, and 2,493,222. The attachments described in these patents provide horizontal surfaces which indirectly obtain their heat from the vertical heating elements of the toaster. However, such attachments as have been previously described although satisfactory for warming and maintaining the crispness of food articles, provide greatly insufficient heat to toast or cook any article. Further, they are complex to construct and difficult to clean. In addition, the use of such attachments as previously described, often results in overheating of the electric toaster itself, with resultant damage thereto.

A primary object of this invention is to provide a device of the character described that is capable of use as a cooking device to produce the usual results obtained by a conventional electric grill plate.

Another object of this invention is to provide such a grill accessory that is easily mounted and removed, and has no electric wires or electric components attached to it or integral therewith, being therefore easy to clean by direct immersion in water for scouring, contrary to usual procedure with electric grills and frying pans having permanently attached electrical components.

Another object of this invention is to provide such a grill accessory which is easy to manufacture at low cost, rugged in construction, durable in use, inexpensive to operate, and efficient in the results obtained.

A further object of this invention is to provide such a grill accessory which, when used with the toaster, will not damage the toaster nor allow it to overheat.

Further objects and a fuller understanding of the invention will hereinafter appear from the following description of a preferred embodiment illustrative of the invention and shown in the accompanying drawings in which:

Fig. 1 is a side view partly broken away of the device in place on an electric toaster.

Fig. 2 is a plan view of the device.

Fig. 3 is an end view of Fig. 2.

Fig. 4 is an end view of the other end, in place on a toaster.

The grill accessory of this invention comprises a solid metallic horizontal grill plate and a plurality of solid metallic parallel vertical depending radiation fins integral therewith. The accessory is so arranged that the plate can be superimposed on top of the toaster while the radiation fins depend vertically into the bread slots between corresponding pairs of vertical heating elements.

In preferred form the device consists of a flat grill plate with a peripheral raised lip having a contiguous fat groove and extended by an insulated manipulating handle. Depending from the plate are two parallel radiation fins perpendicular to the plate and spaced so that they register with the center lines of the parallel toast receiving slots of an automatic electric toaster. The device is arranged so that there is some clearance between the plate and the toaster body.

It is preferred that the metal material of construction be a highly conductive metal such as aluminum, copper, or their alloys. Aluminum is especially preferred because of its low weight, low cost and ease of cleaning.

Referring to the drawings, the grill accessory therein shown, as illustrative of one embodiment of my invention, comprises a grill 10 having a grill plate 11 provided with a raised lip 12 having a fat groove 13 adjacent to said lip. The grill 10 has a manipulating insulated handle 14 extending from one edge. Symmetrically positioned on and depending at right angles from the bottom of plate 11 are two parallel radiation fins 15 and 16. At the ends of the juncture edge between the fin 15 and the plate 11 are positioned shoulders 17 and 18 while the fin 16 has shoulders 19 and 20. Fillets 21 and 30 are positioned longitudinally along fin 15, while fillets 31 and 32 are positioned along fin 16.

This device is used in conjunction with an automatic toaster 22 having a body portion enclosed by a case having a top with a plurality of parallel openings defining the toasting compartments positioned in said body below said openings, and provided with vertical parallel radiant heating elements 23 and 24 in one compartment and 25 and 26 in the other compartment. The toaster is provided with trippers 27 and 28 and switch handle 29.

The width of the fins correspond substantially to the length of the toasting compartments. The depth of the radiation fins correspond substantially to the distance between the top of the conventional mechanical electrically-controlled toast elevator and the top of the casing of the toaster.

In operation, the grill is placed on top of the toaster with the fins extending downwards into the toasting compartments, the positioning shoulders resting on the ends of the openings to the toasting compartments. The switch handle is depressed and allowed to go through its normal cycle. This is repeated in order to preheat the grill which is then ready for normal usage as a grill plate. Each further intermittent cycle of heating keeps the plate sufficiently hot for several minutes after each operation. The number of heat operational cycles depends on the food to be cooked or grilled.

For example, where such an accessory was made of 1/8 inch aluminum in accordance with the illustrated embodiment and used with a McGraw Electric two-compartment, automatic "Toastmaster" of approximately 1200 watt rating, it was found that the temperature of the grill plate surface would reach about 400° F. within two tripping cycles, starting cold. The heat was found to be evenly distributed over the entire grill plate surface. English muffins and bagels sliced in half were evenly toasted and ready for eating within five minutes or so, starting cold. Eggs have been quickly and uniformly fried. In no case has there been any overheating of the toaster itself and the use of the accessory has not damaged the toaster in any way. Cleaning was easily accomplished by placing the accessory in a pan or sink and using the customary scouring methods for pots and pans.

Fabrication of the grill accessory of this invention is simple and inexpensive. With aluminum, for example, the device can be cast in one piece and then attached to the handle. Also, stamping can be used to make the radiation fins and plates with slots. The fins are then fitted into the slots with a press.

While the preferred embodiment of my invention has been described in detail, it will be understood that it is not to be limited to the particular construction set forth, since various changes in the form, material, proportions, and arrangement of parts, and in the details of construction may be resorted to without departing from the spirit and scope of the invention, or destroying any of the advantages contained in the same, heretofore described and defined in the appended claim.

What is claimed is:

A combination of an automatic bread toaster and a grill; said toaster having a plurality of parallel vertical bread compartments each provided with parallel radiant heating elements to form the sides of the compartment and with a toast elevator adapted for vertical reciprocation in said compartment; said grill comprising a solid metallic grill plate and a plurality of fins perpendicular to said plate; said plate being supported on the top of said toaster so that each of said fins depends into and within one of said toast compartments; the depth of said fins corresponding substantially to the distance between the top of said elevator when it is in an elevated position and the top of said toaster; the width of said fins corresponding substantially to the lengths of said openings.

References Cited in the file of this patent

UNITED STATES PATENTS

| | | |
|---|---|---|
| 2,093,939 | Strack | Sept. 21, 1937 |
| 2,493,222 | Braucht | Jan. 3, 1950 |
| 2,556,520 | Bunce | June 12, 1951 |
| 2,595,010 | Simpson | Apr. 29, 1952 |

FOREIGN PATENTS

| | | |
|---|---|---|
| 631,043 | Germany | June 11, 1936 |